(12) United States Patent
Raman et al.

(10) Patent No.: US 9,678,790 B2
(45) Date of Patent: Jun. 13, 2017

(54) DEVICES AND METHODS IMPLEMENTING OPERATIONS FOR SELECTIVE ENFORCEMENT OF TASK DEPENDENCIES

(71) Applicant: QUALCOMM Incorporated, San Diego, CA (US)

(72) Inventors: Arun Raman, Fremont, CA (US); Pablo Montesinos Ortego, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 14/792,740

(22) Filed: Jul. 7, 2015

(65) Prior Publication Data
US 2016/0196162 A1 Jul. 7, 2016

Related U.S. Application Data

(60) Provisional application No. 62/100,690, filed on Jan. 7, 2015.

(51) Int. Cl.
*G06F 9/46* (2006.01)
*G06F 9/48* (2006.01)

(52) U.S. Cl.
CPC .......... *G06F 9/4843* (2013.01); *G06F 9/4881* (2013.01)

(58) Field of Classification Search
None
See application file for complete search history.

(56) References Cited

U.S. PATENT DOCUMENTS

| 7,330,822 | B1 | 2/2008 | Robson et al. |
| 7,467,383 | B2 | 12/2008 | Inchingolo et al. |
| 8,286,172 | B2 | 10/2012 | Chakradhar et al. |
| 2008/0134207 | A1* | 6/2008 | Chamieh ............... G06F 9/4428 719/315 |

(Continued)

FOREIGN PATENT DOCUMENTS

WO 0227479 A1 4/2002

OTHER PUBLICATIONS

International Search Report and Written Opinion—PCT/US2015/063657 ISA/EPO—Mar. 23, 2016.

*Primary Examiner* — Adam Lee
(74) *Attorney, Agent, or Firm* — The Marbury Law Group, PLLC

(57) ABSTRACT

A method and computing device, for enabling selective enforcement of complex task dependencies. The method and allows a computing device to determine whether to enforce task-dependencies based on programmer or end-user goals concerning efficiency and quality of runtime experience. A computing device may be configured to schedule executing a first task, identify an operation (e.g., a "+>" operation) of the first task as being selectively dependent on a second task finishing execution, and determining whether to enforce the dependency of the first task on the second task based on an evaluation of one or more enforcement conditions. If the enforcement conditions are not met, enforcing the dependency, executing the second task, and withholding execution of the first task until execution of the second task has finished. If the enforcement conditions are met, commencing execution of the first task prior to, or parallel to the second task finishing execution.

17 Claims, 12 Drawing Sheets

(56) References Cited

U.S. PATENT DOCUMENTS

| | | |
|---|---|---|
| 2011/0004881 A1 | 1/2011 | Terechko et al. |
| 2011/0185361 A1 | 7/2011 | Ng et al. |
| 2011/0276966 A1 | 11/2011 | Christensen et al. |
| 2013/0125097 A1* | 5/2013 | Ebcioglu ............. G06F 17/5045 717/136 |
| 2014/0282586 A1* | 9/2014 | Shear .................... G06F 9/5072 718/104 |
| 2015/0317190 A1* | 11/2015 | Ebcioglu ............. G06F 17/5045 718/106 |

* cited by examiner

200

202

```
string fetch(string url, string key);

void render(string data, string style);

void display_webpage(string url) {
    string data = fetch(url, "data");
    string style = fetch(url, "style");
    render(data, style);
} void compose_webpages(string[] urls) {
    for (string url : urls) {
            display_webpage(url);
    }
}
```

FIG. 2A
(Prior Art)

```
string fetch(string url, string key);

void render(string data, string style);

void display_webpage(string url) {
    task<string> fd = create_task([=]{fetch(url, "data");});
    task<string> fs = create_task([=]{fetch(url, "style");});
    task<> r = create_task([=](string data, string style){render(data, style);});

->(fd, r); +>(fs, r  timer_exp);
    // Set up task 'r' to execute only after task 'fd' has finished and optionally
    // after task 'fs' has finished, if the condition timer_exp returns true, where
    // timer_exp is a boolean parameter returned by a timer countdown
    //  function launch_tasks(fd, fs, r);
    // Launch tasks for execution wait_for(fd, fs, r);

} void compose_webpages(string[] urls) {
    int i = 0; task[] tasks;
    for (string url : urls) {
        task<> t = create_task([=]{display_webpage(url);});
        launch_task(t);
        tasks[i++] = t;
    wait_for(tasks);
    }

```
void foo() {
    task<> t1 = create_task([]{});
    task<> t2 = create_task([]{});
    +>(t1, res_eval);
    +>(t2, res_eval);
}
```

FIG. 4

```
extern task[] tasks;

void foo() {
    +>(tasks, res_eval);
}
```

FIG. 5

```
extern task<> t1;

void foo() {
    +>(t1, res_eval);
}
```

FIG. 6

```
extern task<> t;
extern task<> u;

void foo() {
    +>(t, res_eval);
} void bar() {
    +>(t, timer_exp);
    ->(u);
}
```

FIG. 7

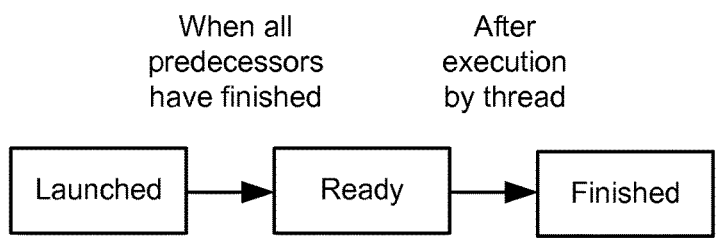

FIG. 8

```
A = create_task([]{...});
B = create_task([]{...->(A);});
C = create_task([]{});
D = create_task([]{});

+>(C, D, user_select_speed);
// task D becomes ready for execution after task C finishes, unless
// the end user specifies that the speed of results return is more
// important than quantity of useful results +>(B, D, user_select_more_results);
// task D becomes ready for execution only after task B finishes, unless
// the end user specifies that the quantity of useful results is more
// important than speed of execution
```

DEVICES AND METHODS IMPLEMENTING OPERATIONS FOR SELECTIVE ENFORCEMENT OF TASK DEPENDENCIES

RELATED APPLICATIONS

This application claims the benefit of priority to U.S. Provisional Application No. 62/100,690 entitled "Programmatic Specification and Enforcement of Complex Task Dependencies in Parallel Programs" filed Jan. 7, 2015 the entire contents of both of which are hereby incorporated by reference.

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, headphones, remote controls, etc.) have become more complex than ever, and now commonly include multiple processors, system-on-chips (SoCs), and other resources that allow mobile device users to execute complex and power intensive software applications (e.g., video streaming, video processing, etc.) on their mobile devices.

Due to these and other improvements, smartphones and tablet computers have grown in popularity, and are replacing laptops and desktop machines as the platform of choice for many users. As mobile devices continue to grow in popularity, improved processing solutions that better utilize the multiprocessing capabilities of the mobile devices will be desirable to consumers.

SUMMARY

The methods and apparatuses of various embodiments provide circuits and methods for managing execution of tasks that exploit the concurrency and parallelism enabled by modern multiprocessor architectures to generate and execute software applications in order to achieve fast response times, high performance, and high user interface responsiveness. The method may include scheduling execution of tasks via a thread in particular processor cores, identifying a first operation (e.g., a "+>" operation) of a task as being selectively dependent on a second task finishing execution, and determining whether to enforce the dependency of the first task on the second task based on an evaluation of a set of enforcement conditions. Embodiment methods may include implementing a first operation (e.g., "+>" operation) for selective enforcement of intertask execution dependencies.

Embodiment methods may further include implementing a second operation (e.g., a "->") for mandatory enforcement of intertask execution dependencies.

Embodiment methods may include commencing execution of a first task via a first thread of a thread pool in the computing device, identifying whether there exists a second task ready for execution such that an operation of the second task identifies the second task as either being dependent on the first task finishing execution or being selectively dependent on the first task finishing execution, and identifying whether there exists a third task ready for execution such that an operation of the second task identifies the second task as either being dependent on the third task finishing execution or being selectively dependent on the third task finishing execution. Embodiment methods may further include commencing execution of the second task via a second thread of the thread pool only after determining that the third task has finished execution in response to identifying that there exists a third task ready for execution such that an operation of the second task identifies the second task as being dependent on the third task finishing execution, and determining whether to enforce the selective dependency of the second task on the third task by determining whether one or more enforcement conditions are satisfied in response to identifying that there exists a third task ready for execution such that an operation of the second task identifies the second task as being selectively dependent on the third task finishing execution. An embodiment method may also include ignoring the selective dependency, and commencing execution of the second task via a second thread of the thread pool in response to determining that the one or more enforcement conditions are met, and commencing execution of the second task via a second thread of the thread pool only after determining that the third task has finished execution in response to determining that the one or more enforcement conditions are not met, thus enforcing the selective dependency.

Embodiment methods may further include identifying whether any additional operations of the second task are either dependent or selectively dependent on any additional tasks other than the first task and third tasks finishing execution.

In some embodiment methods, identifying whether any additional operations of the second task are either dependent or selectively dependent on any additional tasks other than the first task and third tasks finishing execution, may include commencing execution of the second task via a second thread of the thread pool only after determining that the additional tasks have finished execution in response to identifying that there exist additional tasks ready for execution such that an operation of the second task identifies the second task as being dependent on the additional tasks finishing execution.

In some embodiments, identifying whether any additional operations of the second task are either dependent or selectively dependent on any additional tasks other than the first task and third tasks finishing execution may include in response to identifying that there exist additional tasks ready for execution such that an operation of the second task identifies the second task as being selectively dependent on the additional tasks finishing execution, determining whether to enforce the selective dependency of the second task on the additional tasks by determining whether the one or more enforcement conditions are satisfied, ignoring the selective dependency and commencing execution of the second task via a second thread of the thread pool in response to determining that the one or more enforcement conditions are met, and enforcing the dependency and commencing execution of the second task via a second thread of the thread pool only after determining that the additional tasks have finished execution in response to determining that the one or more enforcement conditions are not met In some embodiments, commencing execution of the first task via the first thread of the thread pool may include executing the first task in a first processing core of the computing device, and commencing execution of the second task via the second thread of the thread pool may include executing the second task in a second processing core of the computing device prior to or concurrent with execution of the first task in the first processing core.

In some embodiments, the one or more enforcement conditions are evaluated at the time of execution.

Embodiment methods may further include receiving execution preference information prior to commencing execution of the first task, and setting the one or more enforcement conditions in response to the receiving and based upon the execution preference information.

Embodiments include a computing device having a processor configured with processor-executable instructions to perform operations of one or more of the embodiment methods described above. Such embodiments may include a computing device having a processor configured with processor-executable instructions to perform operations comprising implementing a first operation for selective enforcement of intertask execution dependencies.

Embodiments include a non-transitory processor-readable medium having stored thereon processor-executable software instructions to cause a processor to perform operations of one or more of the embodiment methods described above. Some embodiments may include a non-transitory processor-readable storage medium having stored thereon processor-executable instructions to cause a processor to perform operations comprising implementing a first operation for selective enforcement of intertask execution dependencies.

BRIEF DESCRIPTION OF THE DRAWINGS

The accompanying drawings, which are incorporated herein and constitute part of this specification, illustrate exemplary embodiment of the claims, and together with the general description given above and the detailed description given below, serve to explain the features of the claims.

FIGS. 2A through 2C are illustrations of example prior art solutions for displaying data fetched from many remote sources.

FIGS. 3 through 7 are illustrations of procedures suitable for executing tasks in accordance with various embodiments.

FIG. 8 is a block diagram illustrating state transitions of a task in accordance with various embodiments.

FIG. 9A is an illustration of a procedure that uses the +> statement to optionally decouple task execution dependencies in accordance with an embodiment.

DETAILED DESCRIPTION

Figure 1:
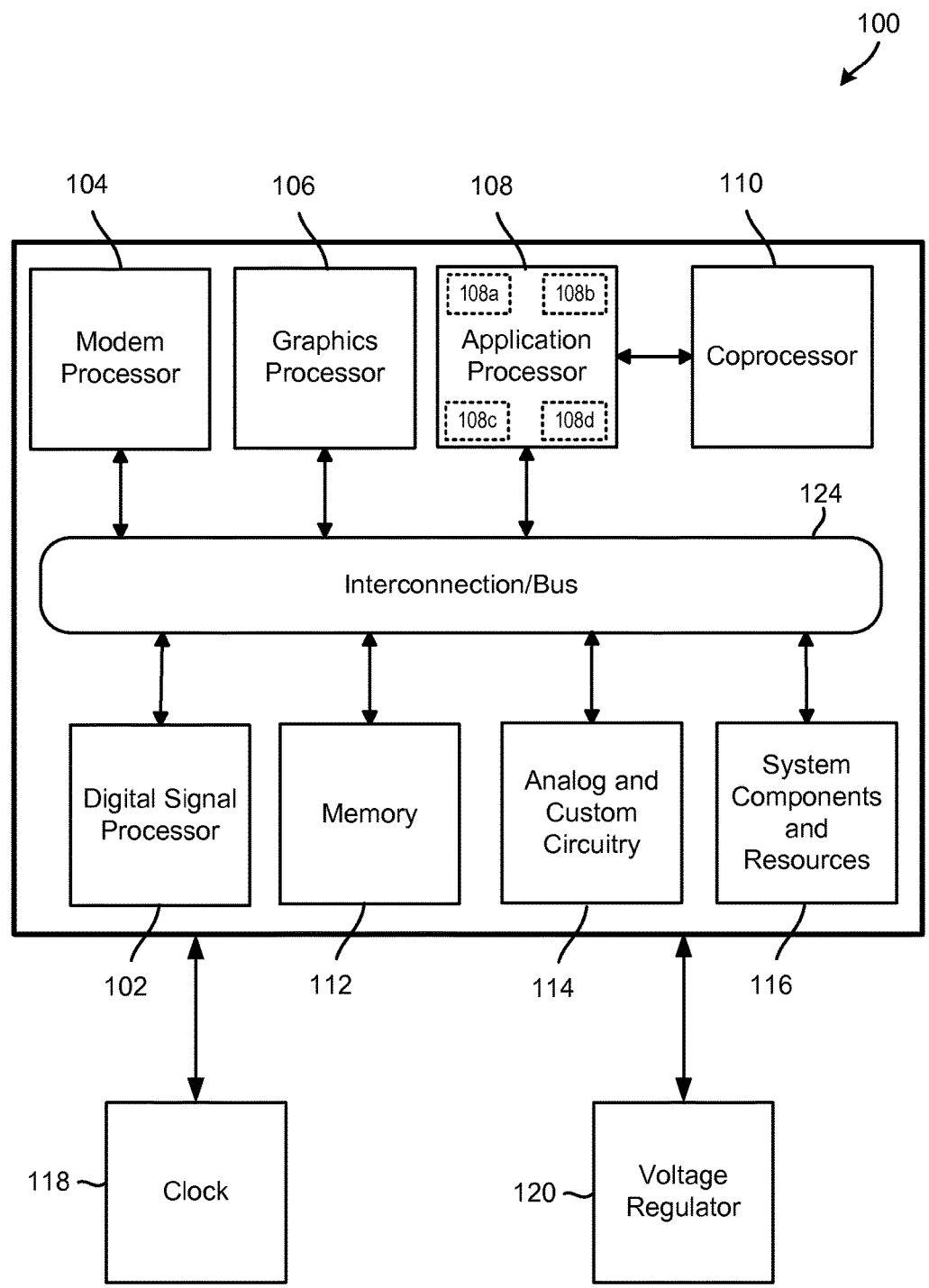
FIG. 1 is an architectural diagram of an example system on chip suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the various embodiments include methods, and computing devices configured to perform the methods, of using techniques that exploit the concurrency/parallelism enabled by modern multiprocessor architectures to generate and execute software applications in order to achieve fast response times, high performance, and high user interface responsiveness.

In the various aspects, a computing device may be configured to schedule executing a first task via a first thread (e.g., in a first processing core), identify an operation (e.g., a "+>" operation) of the first task as being selectively dependent on a second task finishing execution, determining whether to enforce the dependency of the first task on the second task based on an evaluation of a set of enforcement conditions. The computing device may be configured to enforce the dependency and commencing execution of the second task via a second thread (e.g., in a second processing core) and withhold execution of the first task until execution of the second task has finished if the enforcement conditions are met, and commencing execution of the first task prior or parallel to the second task finishing execution if the enforcement conditions are not met. In other words, the computing device may implement a first operation for selective enforcement of intertask execution dependencies.

In various embodiments, the enforcement conditions for ignoring a task dependency may include expiration of a timer, evaluation of runtime system resources, evaluation of task execution time and resource requirements against a pre-defined quality of end-user experience, evaluation of task execution time and resource requirements against a user specified quality of end-user experience, as defined at runtime, and incorporation of other quality-of-experience metrics.

By enabling selective enforcement of task execution dependencies (as opposed to waiting for a first task to finish prior to beginning execution of a second task) the various embodiments allow the computing device to determine whether to enforce task-dependencies based on programmer or end-user goals concerning efficiency and quality of run-time experience. These operations improve the functioning of the computing device by potentially reducing the latencies associated with executing software applications on the device, or by improving software application output quality and reducing the need to execute an application multiple times to achieve desired results. These operations may also improve the functioning of the computing device by improving its efficiency, performance, and power consumption characteristics.

The terms "computing system" and "computing device" are used generically herein to refer to any one or all of servers, personal computers, and mobile devices, such as cellular telephones, smartphones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various embodiments are particularly useful in mobile devices, such as smartphones, which have limited processing power and battery life, the embodiments are generally useful in any computing device that includes a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may used herein to refer to a single module or package that contains multiple resources, computational units, cores and/or processors on two or more IC chips or substrates. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile computing device. The proximity of the SOCs facilitates high-speed communications and the sharing of memory and resources. A SOC may include multiple multicore processors, and each processor in an SOC may be referred to as a core. The term "multiprocessor" is used herein to refer to a system or device that includes two or more processing units configured to read and execute program instructions.

The term "context" is used herein to refer to any information available to a process or thread running in a host operating system (e.g., Android, Windows 8, LINUX, etc.), and may include operational state data and permissions and/or access restrictions that identify the operating system services, libraries, file systems, and other resources that the process or thread may access.

In an embodiment, a process may be a software representation of a software application. Processes may be executed on a processor in short time slices so that it appears that multiple applications are running simultaneously on the same processor (e.g., by using time-division multiplexing techniques). When a process is removed from a processor at the end of a time slice, information pertaining to the current operating state of the process (i.e., the process's operational state data) is stored in memory so the process may seamlessly resume its operations when it returns to execution on the processor.

A process's operational state data may include the process's address space, stack space, virtual address space, register set image (e.g., program counter, stack pointer, instruction register, program status word, etc.), accounting information, permissions, access restrictions, and state information. The state information may identify whether the process is a running state, a ready or ready-to-run state, or a blocked state. A process is in the ready-to-run state when all of its dependencies or prerequisites for execution have been met (e.g., memory and resources are available, etc.), and is waiting to be assigned to the next available processing unit. A process is in the running state when its procedure is being executed by a processing unit. A process is in the blocked state when it is waiting for the occurrence of an event (e.g., input/output completion event, etc.).

A process may spawn other processes, and the spawned process (i.e., a child process) may inherit some of the permissions and access restrictions (i.e., context) of the spawning process (i.e., the parent process). A process may also be a heavy-weight process that includes multiple light-weight processes or threads, which are processes that share all or portions of their context (e.g., address space, stack, permissions and/or access restrictions, etc.) with other processes/threads. Thus, a single process may include multiple threads that share, have access to, and/or operate within a single context (e.g., a processor, process, or software application's context).

A multiprocessor system may be configured to execute multiple threads concurrently or in parallel to improve a process's overall execution time. In addition, a software application, operating system, runtime system, scheduler, or another component in the computing system may be configured to create, destroy, maintain, manage, schedule, or execute threads based on a variety of factors or considerations. For example, to improve parallelism, the system may be configured to create a thread for every sequence of operations that could be performed concurrently with another sequence of operations.

Creating and managing threads may require that the computing system perform complex operations that consume a significant amount of time, processor cycles, and device resources (e.g., processing, memory, or battery resources, etc.). As such, software applications that maintain a large number of idle threads, or frequently destroy and create new threads, often have a significant negative or user-perceivable impact on the responsiveness, performance, or power consumption characteristics of the computing device.

To reduce the number of threads that are created and/or maintained by the computing system, a software application or multiprocessor system may be configured to generate, use, and/or maintain a thread pool that includes approximately one thread for each of the available processing units. For example, a four-core processor system may be configured to generate and use a thread pool that maintains four threads—one for each of its four processing cores. A process scheduler or runtime system of the computing device may schedule these threads to execute in any of the available processing cores, which may include physical cores, virtual cores, or a combination thereof. As such, each thread may be a software representation of a physical execution resource (e.g., processing core, etc.) that is provided by the hardware platform of the computing device (e.g., for the execution of a process or software application).

To provide adequate levels of parallelism without requiring the creation or maintenance of a large number of threads, the software application or multiprocessor system may implement or use a task-parallel programming model or solution. Such solutions allow the computing system to split the computation of a software application into tasks, assign the tasks to the thread pool that maintains a near-constant number of threads (e.g., one for each processing unit), and execute assigned tasks via the threads of the thread pool. A process scheduler or runtime system of the computing system may schedule tasks for execution on the processing units, similar to how more conventional solutions schedule threads for execution.

A task may include any procedure, unit of work, or sequence of operations that may be executed in a processing unit via a thread. A task may be process-independent to other tasks, yet dependent on other tasks. For example, a first task may be dependent on another task (i.e., a predecessor task) finishing execution, and other tasks (i.e., successor tasks) may depend on the first task finishing execution. These relationships are known as inter-task dependencies.

Tasks may be unrelated to each other except via their inter-task dependencies. The runtime system of a computing device may be configured to enforce these inter-task dependencies (e.g., by executing tasks after their predecessor tasks have finished execution). A task may finish execution by successfully completing its procedure (i.e., by executing all of its operations) or by being canceled. In an embodiment, the runtime system may be configured to cancel dependent (successor) tasks if a task finishes execution as a result of being canceled.

A task may include state information that identifies whether the task is launched, ready, or finished. In an embodiment, the state information may also identify whether the task is in an "executed" state. A task is in the launched state when it has been assigned to a thread pool and is waiting for a predecessor task to finish execution and/or for other dependencies or prerequisites for execution to be met. A task is in the ready state when all of its dependencies or prerequisites for execution have been met (e.g., all of its predecessors have finished execution), and is waiting to be assigned to the next available thread. A task may be marked as finished after its procedure has been executed by a thread or after being canceled.

Task-parallel programming solutions may be used to build high-performance software applications that are responsive, efficient, and which otherwise improve the user experience. These software applications may be executed or performed in variety of computing devices and system architectures, an example of which is illustrated in FIG. 1.

FIG. 1 illustrates an example system-on-chip (SOC) 100 architecture that may be included in an embodiment computing device configured to execute run software applications that implement the task-parallel programming model and/or to execute tasks in accordance with the various embodiments. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor) connected to one or more of the heterogeneous processors 102, 104, 106, 108. In an embodiment, the graphics processor 106 may be a graphics processing unit (GPU).

Each processor 102, 104, 106, 108, 110 may include one or more cores (e.g., processing cores 108a, 108b, 108c, and 108d illustrated in the application processor 108), and each processor/core may perform operations independent of the other processors/cores. SOC 100 may include a processor that executes an operating system (e.g., FreeBSD, LINUX, OS X, Microsoft Windows 8, etc.) which may include a scheduler configured to schedule sequences of instructions, such as threads, processes, or data flows, to one or more processing cores for execution.

The SOC 100 may also include analog circuitry and custom circuitry 114 for managing sensor data, analog-to-digital conversions, wireless data transmissions, and for performing other specialized operations, such as processing encoded audio and video signals for rendering in a web browser. The SOC 100 may further include system components and resources 116, such as voltage regulators, oscillators, phase-locked loops, peripheral bridges, data controllers, memory controllers, system controllers, access ports, timers, and other similar components used to support the processors and software programs running on a computing device.

The system components and resources 116 and/or custom circuitry 114 may include circuitry to interface with peripheral devices, such as cameras, electronic displays, wireless communication devices, external memory chips, etc. The processors 102, 104, 106, 108 may communicate with each other, as well as with one or more memory elements 112, system components and resources 116, and custom circuitry 114, via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., a DSP 102, a modem processor 104, a graphics processor 106, an application processor 108, etc.).

In addition to the SOC 100 discussed above, the various embodiments (including, but not limited to, embodiments discussed below with respect to FIGS. 3-7, 8B, 9A, 9B and 10) may be implemented in a wide variety of computing systems, which may include multiple processors, multicore processors, or any combination thereof.

Figure 2B:
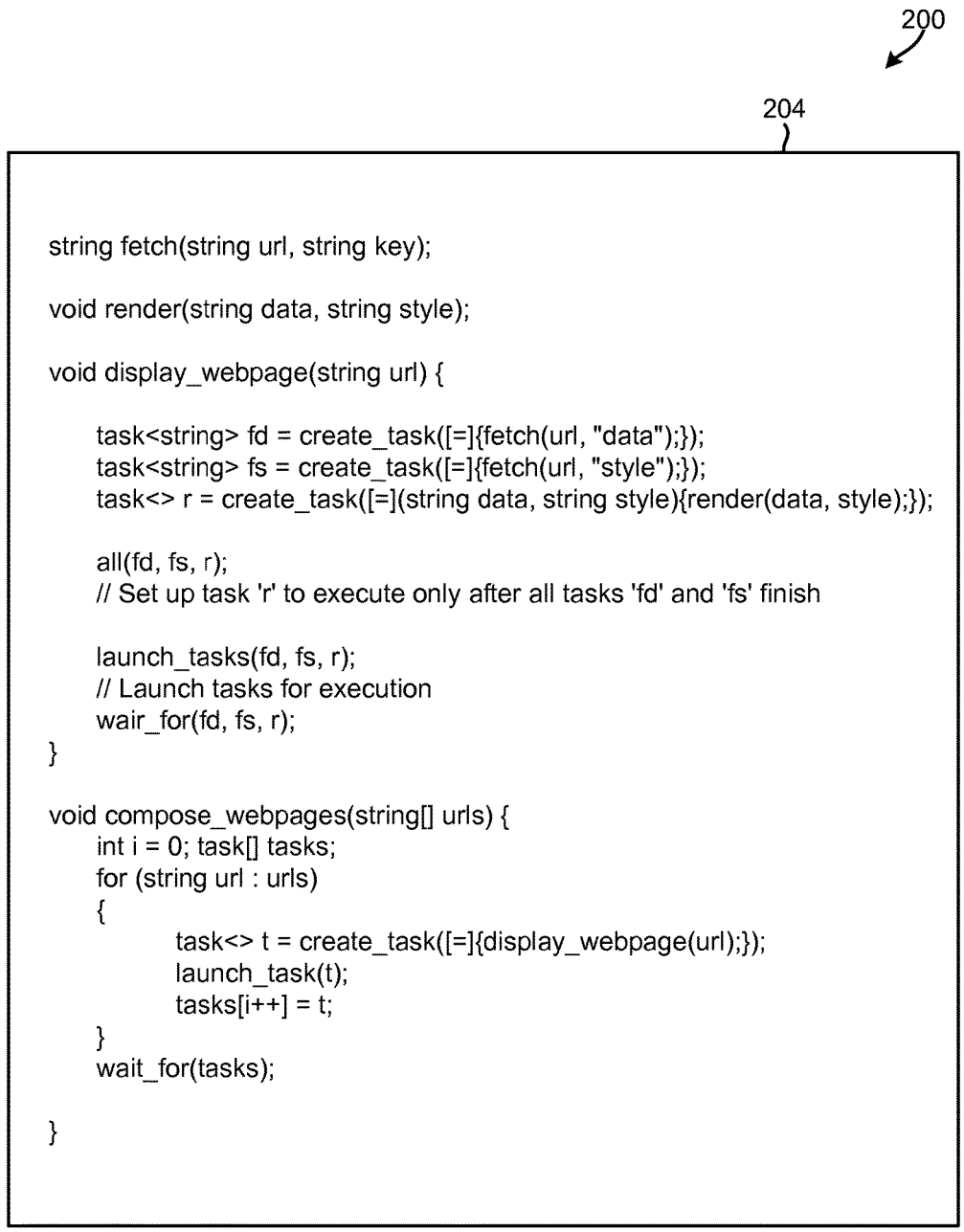
Figure 2C:
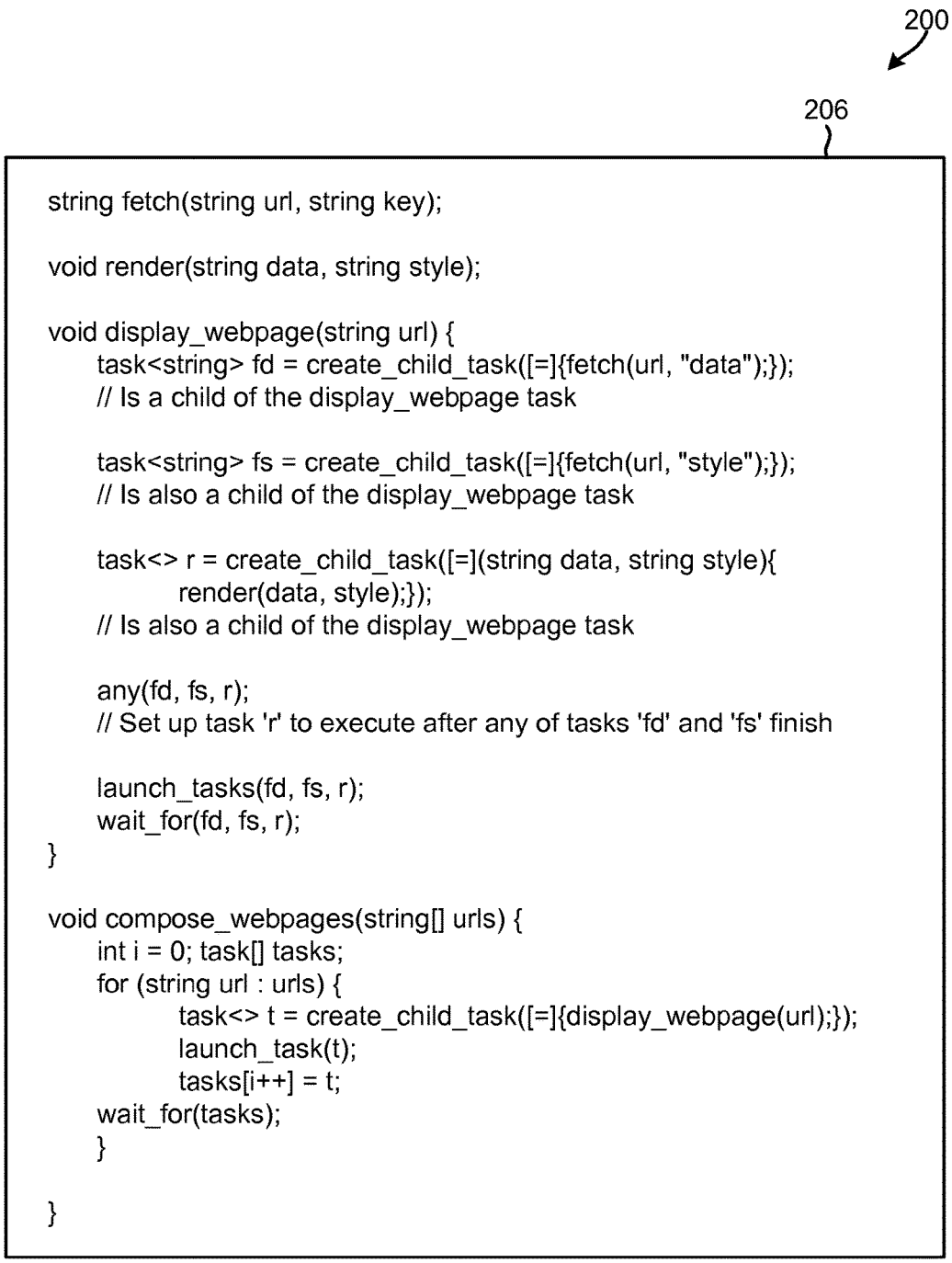

FIGS. 2A through 2C illustrate different prior art procedures 202, 204, 206 for accomplishing the operations of fetching multiple webpages from remote servers and building a composite display of the webpages. Each of these procedures 202, 204, 206 includes functions or sequences of instructions that may be executed by a processing core of a computing device, including a fetch function, a render function, a display_webpage function, and a compose_webpages function.

The procedure 202 illustrated in FIG. 2A is a sequential procedure that performs the operations of the functions one at a time. For example, the compose_webpages function sequentially calls the display_webpage function for each URL in a URL array. By performing these operations sequentially, the illustrated procedure 202 does not exploit the parallel processing capabilities of the computing device or provide the system, programmer, or end-user with any flexibility in modifying the order of task execution based on runtime parameters.

The procedure 204 illustrated in FIG. 2B implements a conventional task-parallel programming model by splitting some of the functions (modularly) into tasks and identifying task dependencies. For example, FIG. 2B illustrates that the compose_webpages function creates and uses the tasks to execute the display_webpage function for each URL in the URL array. Each of the tasks may be executed in parallel with the other tasks (if they have no inter-task dependencies) without creating new threads.

While procedure 204 is an improvement over the sequential procedure 202 (illustrated in FIG. 2A), it does not provide any flexibility in order of task execution or in optional enforcing inter-task dependencies. This is because procedure 204 uses the 'all' statements to respect the semantics of sequential synchronous function calls and synchronize tasks correctly. The 'all' statement establishes an inter-task dependency by blocking task execution until all predecessor tasks and their inter-task dependencies are resolved For example, the display_webpage function of procedure 204 is not finished until tasks 'fd', 'fs', and 'r' are finished. The presence of the 'all' statement requires that all the tasks 'fd' and 'fs' must finish execution before task 'r' can execute and the display_webpage function can be marked as finished.

Such waiting may adversely affect the responsiveness of the application (and thus the computing device). The 'all' statement blocks the thread executing the task (i.e., by causing the thread to enter a blocked state), which may result in the computing device spawning new threads (i.e., to execute other tasks that are ready for execution). As discussed above, the creation/spawning of a large number of threads may have a negative impact on the performance and power-consumption characteristics of the computing device. For all these reasons, procedure 204 is not an adequate solution for handling of complex task dependencies of a computing device.

The procedure 206 illustrated in FIG. 2C implements a task-parallel programming model that uses the parent-child relationships among tasks to avoid redundant dependency operations. For example, when the display_webpage function of procedure 206 is invoked inside a task created in the compose_webpages function, any task that it further creates is deemed to be its child task. Within the display_webpage function, an 'any' statement is employed to define the dependency of task 'r' on the completion of any of tasks 'fd' or 'fs'. Procedure 206 is insufficient to adequately address the need for selective handling of complex task dependencies. In the example, rendering of a webpage may occur prior to completion of data and style fetching tasks, because the programmer deemed expediency of deliverable results more important than the completeness of a displayed webpage. This approach does not permit modification to the dependencies based on changes outcome goals.

FIG. 3 illustrates an embodiment procedure 302 that uses tasks to fetch multiple webpages from remote servers and to build a composite display of multiple webpages. The procedure 302 may be performed by one or more processing units of a multiprocessor system. The code, instructions, and/or statements of procedure 302 are similar to those of the procedure 204 described with reference to FIG. 2B, except that the 'any' and 'all' statements have been replaced by '+>' and '->' statements.

When performing the procedure 302, the thread that executes the render task 'r' may not be forced to wait on all of the fetch tasks 'fd' and 'fs' to finish before beginning execution of task 'r.' Inter-task dependencies may be established via the '+>' statement and optionally by an '->' statement. The '->' statement may establish that the dependency of the task 'r' on the task 'fd' is mandatory and must be honored, therefore task 'fd', data fetching, must finish execution prior to execution of the task 'r.' Conversely, the statement '+>' may establish that the dependency of task 'r' on task 'fs' is selectively enforceable according to whether the enforcement condition represented by the 'timer_exp' parameter returns true. Thus, if the enforcement conditions established in a function returning 'timer_exp' are met (e.g., a function having a countdown timer that returns true if the timer has expired when the render call is made), 'timer_exp' may return true, resulting in the ignoring of the dependency between the task 'r' and the task 'fs.' If the dependency between tasks is ignored due to satisfaction of a condition, task 'r' may execute during, or prior to task 'fs' finishing. If the condition is not satisfied (i.e., timer_exp returns false), the dependency of task 'r' on task 'fs' may be enforced in the same or similar manner as mandatory dependencies.

Enforcement conditions for ignoring an inter-task dependency established by the +>' statement may be determined by a software programmer, or computer or code generator tool, or may be provided as options selectable by an end-user of the application. In an embodiment, a timer may be set to allow for a predecessor task to finish execution. If the timer expires, the task dependency may be ignored and the successor task allowed to execute in parallel with the predecessor task. In various embodiments, conditions may amount to an evaluation of runtime system resource conditions, in which inter-task dependency is honored only if the running of tasks in parallel would require substantial resources. In various embodiments, inter-task dependencies may be ignored if linear execution would require a substantial length of wait time. In various embodiments, one or more end-users may provide input to a function based on desired characteristics of their user experience, and inter-task dependencies may be ignored or enforced according to the time and resource allocation needs necessary to meet the desired experience characteristics.

This is in contrast to procedure 204 (illustrated in FIG. 2B) in which the thread executing the task 'r' will be blocked at the 'all' operation and forced to wait on completion of tasks 'fd' and 'fs' regardless of exterior conditions, quality of experience metrics, or end-user execution expectations.

Thus, in contrast to the 'all' or 'any' statements, the +> statement selectively enforces inter-task dependencies, adds little or no overhead to the runtime system, and allows a software designer or end-user to specify the conditions required for a task to achieve desired execution. The +> statement also allows the computing system to perform more complex operations on tasks than solutions that use parent-child relationships of tasks (e.g., procedure 206 illustrated in FIG. 2C).

In addition, the +> statement may be used to create modular and composable selective task dependency programming solutions, and to overcome any or all the above-described limitations of conventional solutions. For example, the +> statement allows a programmer to programmatically specify and selectively enforce complex task dependencies.

The +> statement also empowers the programmer to relate tasks to each other in several useful ways. For example, FIG. 4 illustrates that the +> statement may be used to identify a task as selectively dependent on multiple tasks, and further specify that the multiple task dependencies are selectively honored according to the same conditions. As another example, FIG. 5 illustrates that the +> statement may be used to identify a task as selectively dependent on a group of tasks. As a further example, FIG. 6 illustrates that the +> statement may be used to identify a current task as selectively dependent on tasks that were not created or spawned by the current task. As a further example, FIG. 7 illustrates that the +> statement may be used by multiple tasks to identify that they are selectively dependent on the same task, but subject to different enforcement conditions. These and other capabilities provided by the +> statement and its corresponding operations are new capabilities not provided by conventional solutions (e.g., solutions that require all or any of the predecessor tasks to finish execution, etc.), and that have the potential to improve the functioning and performance of computing devices implementing software using the statement.

The +> statement may also be used by a computing system to better implement the 'all' relationship among tasks. For example, when a first task (task A) is selectively dependent on a second task (task B) and a third task (C), the runtime system can internally mark the first task (task A) as finishing after the second task and the third task (e.g., via a +>(B, C, A) operation). The first task (task A) will execute after the second task (task B) and the third task (task C) finish, absent satisfaction of the enforcement condition, giving the exact same semantics as those provided by the 'all' statement. In an embodiment, a mandatory dependency statement '->' may be included. Similar results may be obtained through use of the mandatory dependency statement -> such that the system internally marks the first task (task A) as being dependent on the second task (task B) and the third task (task C) finishing execution.

By using the +> statement, a software designer is able to specify and selectively enforce complex task dependencies in a task-parallel programming model in a modular and composable manner, while enabling extraction of maximum performance from the parallel hardware.

FIG. 8 illustrates state transitions for a task having one or more inter-task dependencies. Specifically, FIG. 8 illustrates that the task transitions from the launched state to the ready state when all of its predecessors, mandatory or selective, have finished execution or been ignored. After transition to the ready state, the task may transition from the ready state to the finished state after its procedure is executed by a thread. The decision whether to execute predecessor tasks whose optional dependencies are ignored by the successor task, may be determined based on programmer specifications, runtime parameters, or end-user input.

FIG. 9A illustrates a procedure 900 that uses the +> and the -> statements so as to define selective and mandatory task dependencies in accordance with the various embodiments. The procedure 900 creates four tasks (Tasks A-D). Task B includes a -> statement that indicates it will not be completely finished until Task A finishes execution. Task D is selectively dependent on Task C according to the enforcement condition represented by the parameter 'user_select_speed', and thus becomes ready for execution after Task C is marked as finished, unless the end-user indicates that the speed of results return is highly desired and the enforcement condition evaluates true, in which case, Task D may be allowed to execute in parallel with or prior to Task C finishing. Similarly, Task D is selectively dependent on Task B according to the enforcement condition represented by the parameter 'user_select_more_results', which will return true if the end-user indicates that the quantity of useful results returned is more important than the execution speed, in which case the dependency will be ignored. In this manner, the end-user may toggle the quality of their user experience at software application runtime by providing input that triggers selective enforcement of the inter-task dependencies established via the +> statement.

Figure 9B:
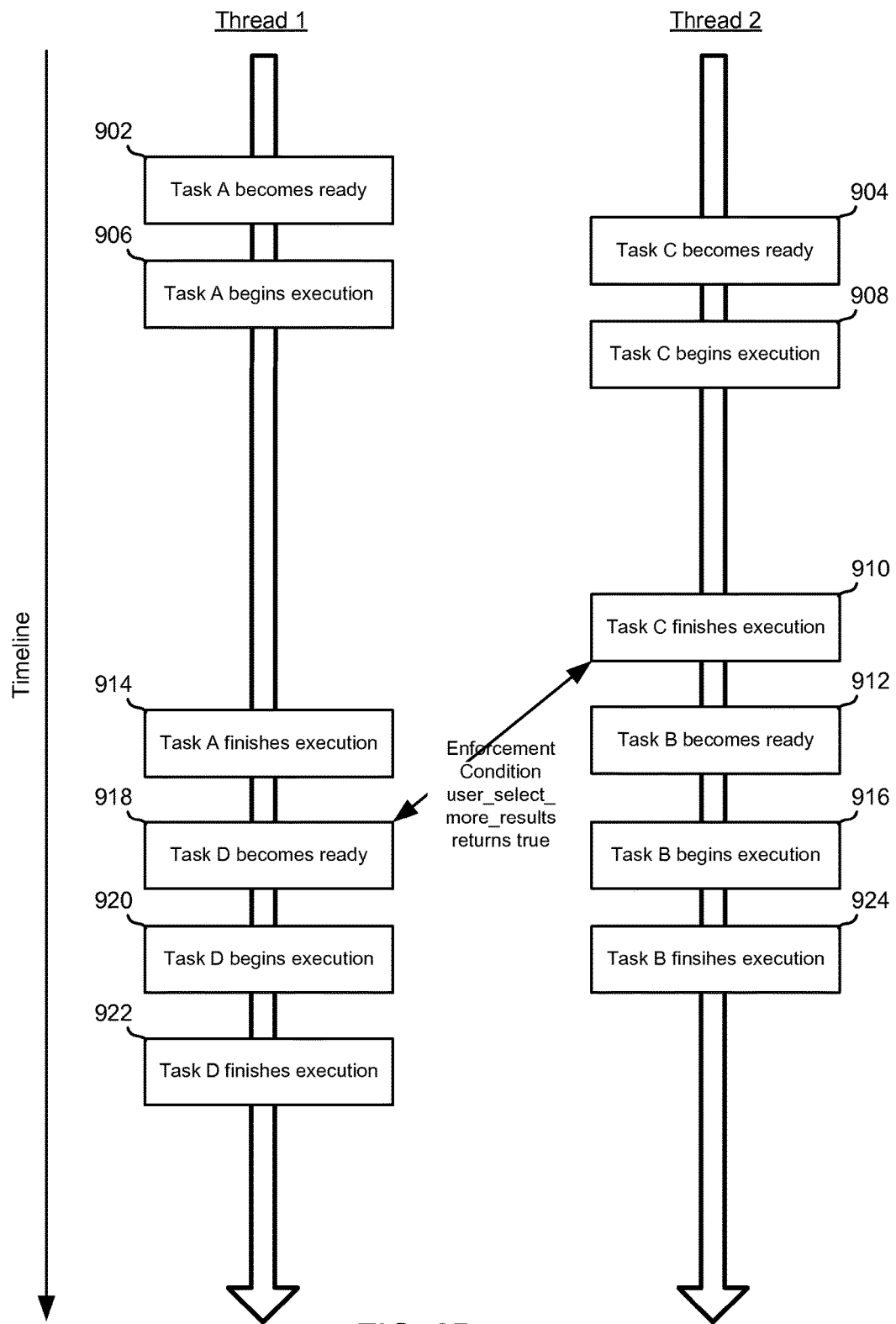
FIG. 9B is a timing diagram illustrating operations of the tasks of the procedure illustrated in FIG. 9A.

FIG. 9B is an illustration of a timeline of the execution of the tasks of the procedure 900 via a first thread (Thread 1) and a second (Thread 2). In block 902, Task A becomes ready for execution. In block 906, Task A begins execution via the first thread. Task B has the predecessor Task A as established by the -> mandatory dependency statement and waits for Task A to finish execution before becoming ready. In block 904, Task C becomes ready for execution. Task D has selective dependency on Task B and Task C, and evaluates the enforcement conditions represented by the parameters 'user_select_speed' and 'user_select_more_results' prior to determining if the predecessor dependencies should be honored. In block 908, Task C begins execution via the second thread. In block 910, Task C finishes executing its procedure.

In block 914 Task A finishes execution. In block 912 Task B, which has a mandatory dependence on Task A and thus waited for Task A to finish execution at block 914, becomes ready and in block 916 begins execution. Task B finishes execution in block 924.

In the example illustrated in FIG. 9B, the enforcement condition represented by the parameter 'user_select_more_results' returned true, indicating that Task D may ignore the inter-task dependency on Task B. Task C has already finished execution at block 910, thus all of Task D's dependencies are resolved. In block 918 Task D becomes ready (since its dependencies on Task C and Task B have been resolved). In block 920 Task D begins execution, and in block 922 Task D finishes execution without waiting for Task B to finish execution.

While in many instances the first and second tasks will be from different threads, there are cases in which the first and second tasks may be part of the same thread. An example of such an instance is illustrated in the following sequence:
  task A=create_task([ ]{ });
  task B=create_task([&]{+>(A, enforce_cond);});
  launch(A);
  launch(B).

Figure 10:
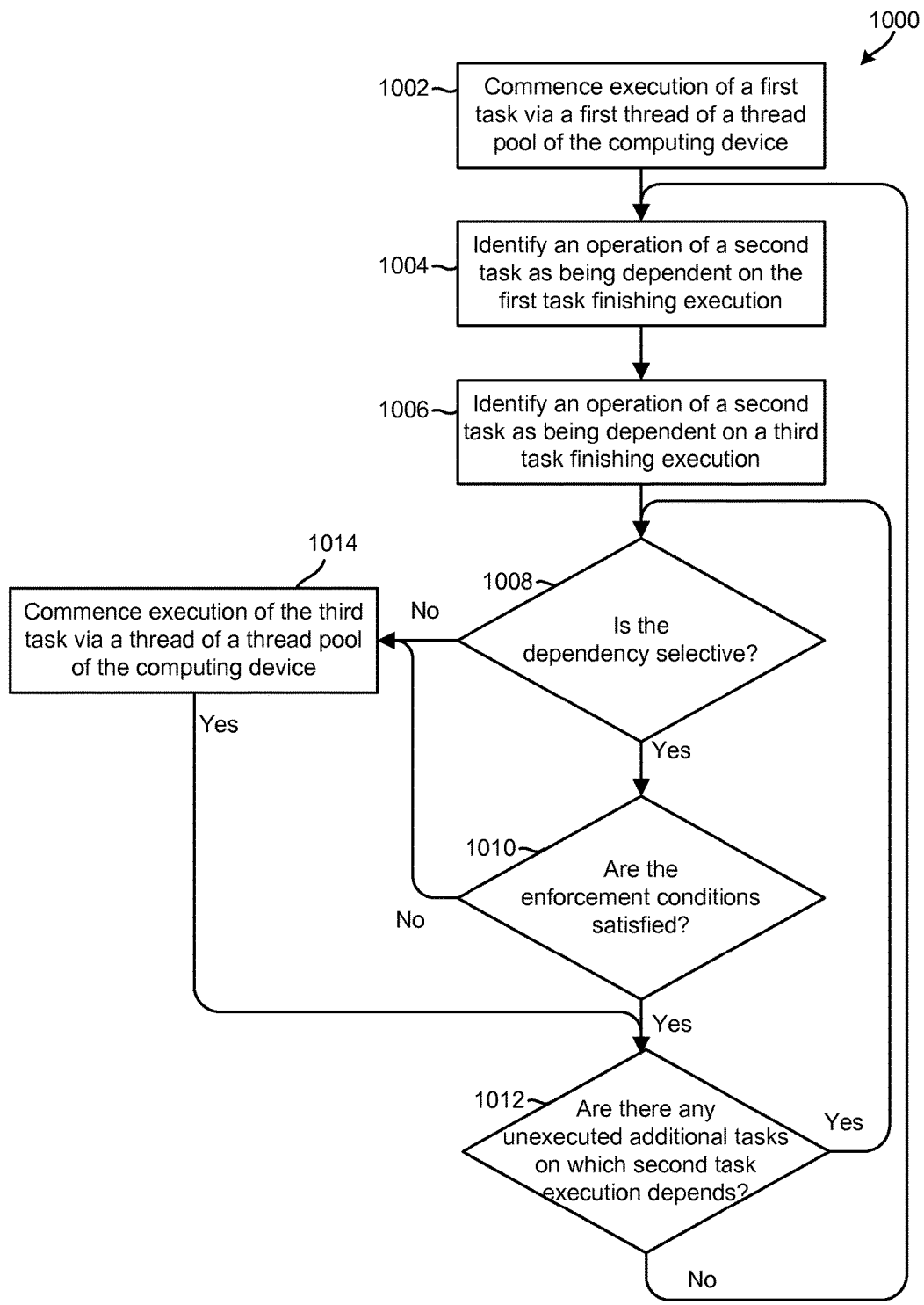
FIG. 10 is a process flow diagram illustrating a method of executing tasks in accordance with an embodiment.

FIG. 10 illustrates a method 1000 of executing tasks in a computing device according to various embodiments. The method may include tasks in a computing device including the implementing of a first operation (e.g., a "+>" operation) for selective enforcement of intertask execution dependencies. The method may further include implementing a second operation (e.g., a "->" operation) for mandatory enforcement of intertask execution dependencies. The method 1000 may be performed by one or more processing cores of the computing device even though the method is described with reference to a single processing core. In block 1002, the processing core may commence the execution of a first task via a first thread of a thread pool of the computing device. In some embodiments, commencing the execution of a first task may include the execution and finishing of the first task. In some embodiments, the finished task may be added to a scheduling queue to enable scheduling of successor tasks.

In block 1004, the processor may identify an operation (e.g., a +> or a -> statement) of the second task as being dependent on the first task finishing execution. Thus, the processor may identify any successor tasks such that the successor (a second task) is either selectively dependent (e.g., via a +> statement) or mandatorily dependent (e.g., via a -> statement) on the first task finishing execution. In some embodiments, any identified successors may be added to a ready queue to await execution, because their dependency on the first task has been resolved at block 1002.

In block 1006 the processor may identify an operation (e.g., a +> or -> statement) of the second task as being dependent on a third task finishing execution. Thus, the processor may identify whether there exists any predecessor tasks to the second task such that execution of the second task is either selectively dependent (e.g., via a +> statement) or mandatorily dependent (e.g., via a -> statement) on the predecessor task(s) (a third task). In some embodiments, if no predecessor tasks exist, the second task may remain in the ready queue to await execution. In some embodiments, if predecessor tasks do exist, the second task may be removed from the ready queue until all its inter-task dependencies, mandatory or selective, are resolved.

In block 1008, the processor executing the tasks via one or more threads of a thread pool, may determine whether the inter-task dependencies identified at block 1006 are selective, i.e., linked to enforcement conditions, or mandatory. If the dependency is mandatory, the third task may be moved to the ready queue (if it is not already in the ready queue) to await commencing of execution via an open thread of the thread pool, as in block 1014. In some embodiments, commencing the execution of the third task may occur similarly to the process described in block 1002. If the dependency is selective, the processor may determine whether to enforce the dependency.

In block 1010, the processor may determine whether to enforce the inter-task dependency by determining whether the one or more enforcement conditions are satisfied. In an embodiment, the enforcement conditions may be an evaluation of runtime conditions to determine the most resource efficient order of task execution, which instructs the scheduler to enforce a dependency only if it is efficient to do so. In an embodiment, the enforcement conditions may incorporate metrics of user satisfaction such as quality-of-output, latency, throughput, power, etc. to allow the scheduler to decide whether a selective dependency should be enforced or ignored. In an embodiment, the enforcement condition may be a timer during which the successor may wait for the predecessor to finish execution, and which may instruct the scheduler to enforce the dependency so long as time is left on the timer, and ignore the dependency after the expiration of the timer. In an embodiment, the enforcement conditions may be one or more options provided to an end-user by the software application at runtime, wherein the end-user's selection may determine which dependencies will be enforced. For example, an end-user may be provided with a sliding toggle offering a range between graphics quality and character motion speed in a game. When the end-user adjusts the sliding toggle, the scheduler determines whether or not enforcing task dependencies comports with the enforcement condition set by the end-user. In another embodiment, the end-user may be prompted by the software application at the time of execution, to decide whether to enforce the dependency.

If one or more of the enforcement conditions associated with the selective dependency are not satisfied, the dependency may be enforced and the third task may commence execution as in block 1014. Thus, the second task may not be allowed to begin execution until the third task has finished.

If the one or more enforcement conditions are satisfied the second task's dependency on the third task may be ignored. In block 1012, the processor may determine whether any unexecuted predecessor dependencies of the second task remain unresolved. The determination at block 1012 may also be performed after the third task finishes execution.

If no unexecuted predecessor dependencies remain, the process may return to block 1002, where the second task begins execution via an available thread of the thread pool, and may be added to the scheduling queue so that the second task's successors may be identified.

In an embodiment, commencing of the execution of the first task in block 1002 includes executing the first task in a first processing core of the computing device, and commencing execution of the second task includes executing the second task in a second processing core of the computing device prior to or concurrent with the first task due to ignoring of a selective dependency whose enforcement conditions have been satisfied.

Figure 11:
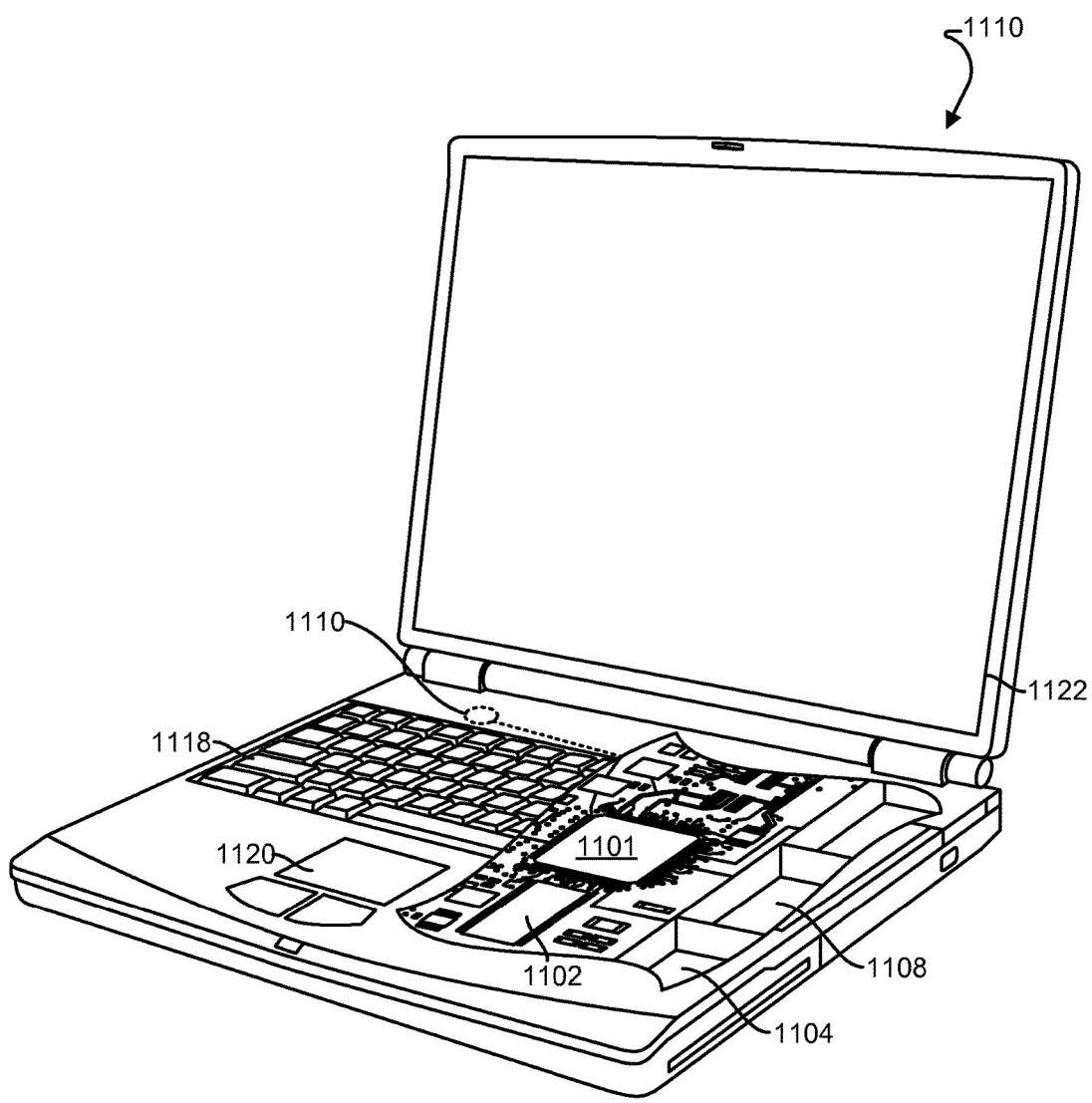
FIG. 11 is a block diagram of an example laptop computer suitable for use with the various embodiments.
Figure 12:
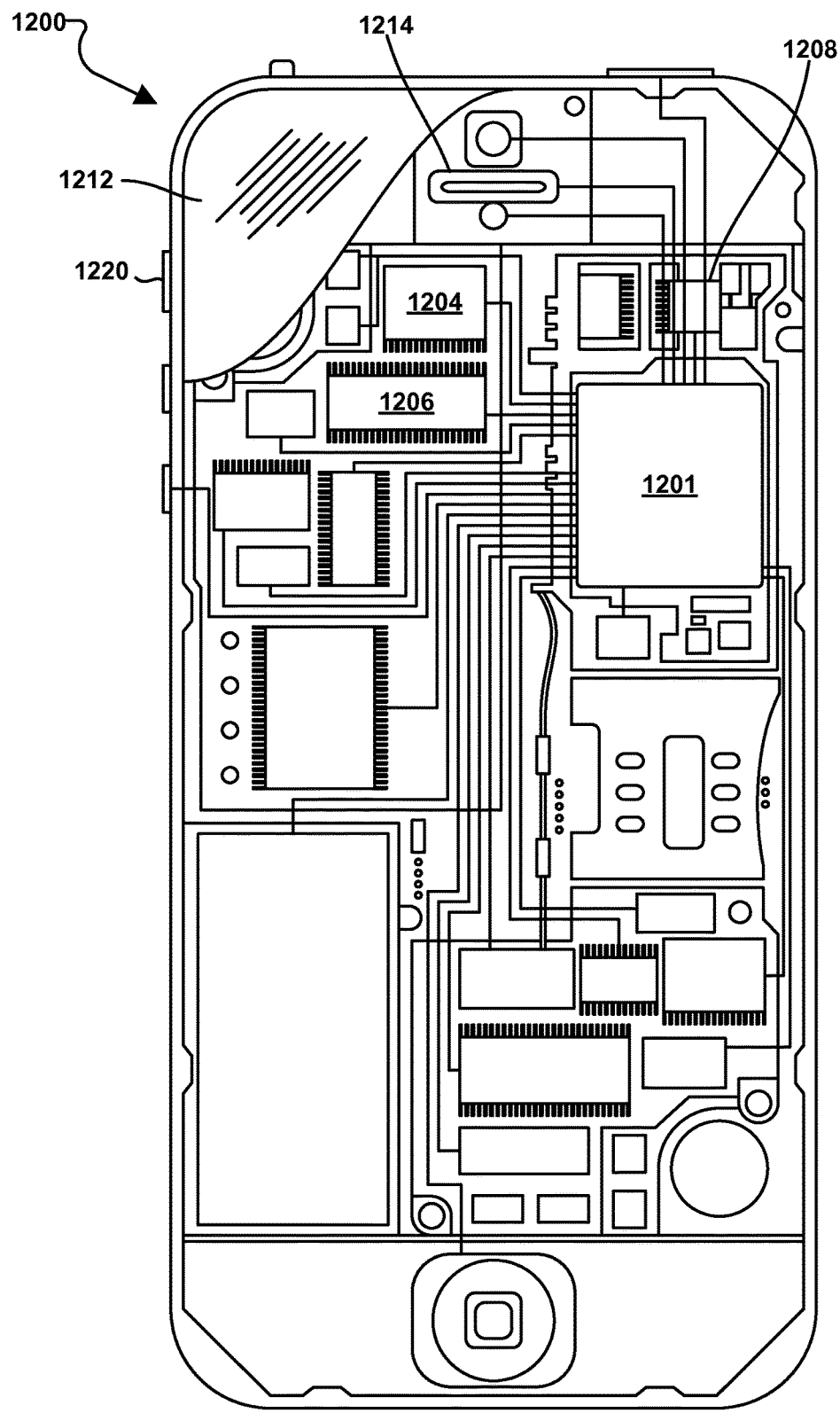
FIG. 12 is a block diagram of an example smartphone suitable for use with the various embodiments.
Figure 13:
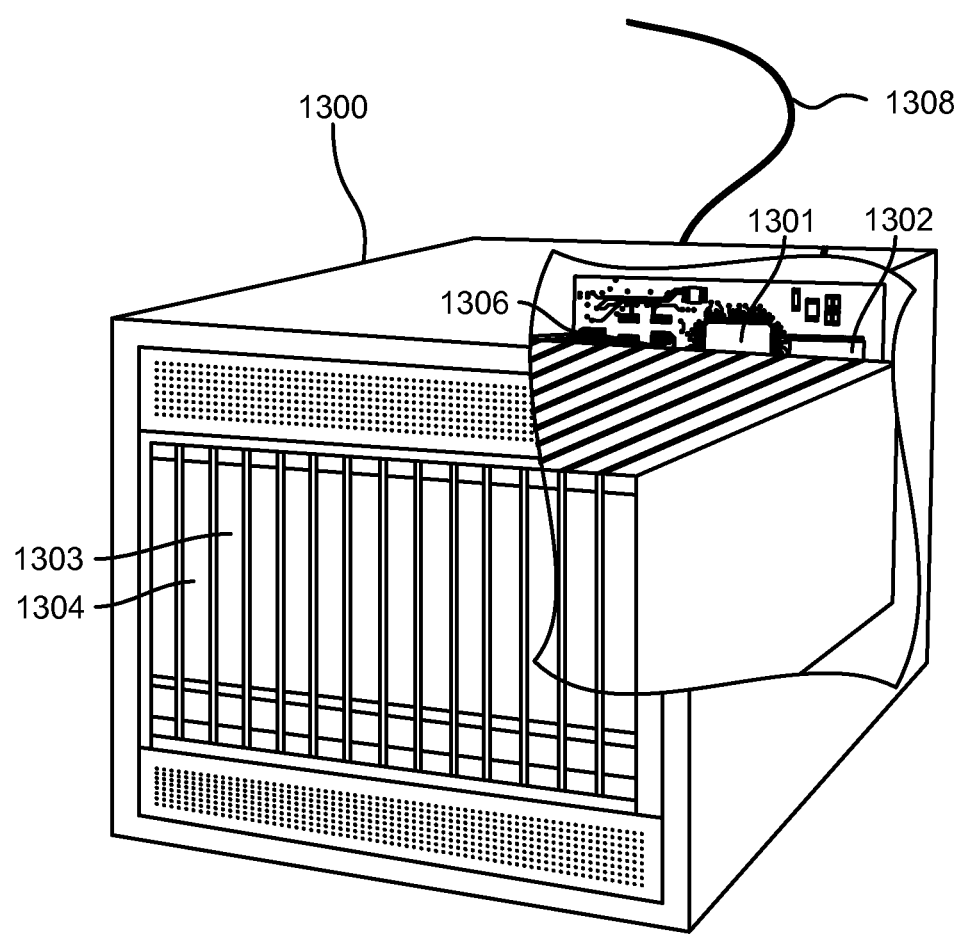
FIG. 13 is a block diagram of an example server computer suitable for use with the various embodiments.

The various embodiments (including but not limited to embodiments discussed above with respect to FIGS. 1, 3-7, 8, 9A, 9B and 10) may be implemented on a variety of computing devices, examples of which are illustrated in FIGS. 11-13.

Computing devices will have in common the components illustrated in FIG. 11, which illustrates an example personal laptop computer 1100. Such a personal computer 1100 generally includes a multi-core processor 1101 coupled to volatile memory 1102 and a large capacity nonvolatile memory, such as a disk drive 1104. The computer 1100 may also include a compact disc (CD) and/or DVD drive 1108 coupled to the processor 1101. The personal laptop computer 1100 may also include a number of connector ports coupled to the processor 1101 for establishing data connections or receiving external memory devices, such as a network connection circuit for coupling the processor 1101 to a network. The personal laptop computer 1100 may have a radio/antenna 1110 for sending and receiving electromagnetic radiation that is connected to a wireless data link coupled to the processor 1101. The computer 1100 may further include keyboard 1118, a pointing a mouse pad 1120, and a display 1122 as is well known in the computer arts. The multi-core processor 1101 may include circuits and structures similar to those described above and illustrated in FIG. 1.

Various embodiments may include a computing device having a processor configured with processor-executable instructions to perform operations comprising implementing a first operation for selective enforcement of intertask execution dependencies. FIG. 12 illustrates an exemplary computing device, a smartphone 1200 that includes a multi-core processor 1201 coupled to internal memory 1204, a display 1212, and to a speaker 1214. Additionally, the smartphone 1200 may include an antenna for sending and receiving electromagnetic radiation that may be connected to a wireless data link and/or cellular telephone transceiver 1208 coupled to the processor 1201. Smartphones 1200 typically also include menu selection buttons or rocker switches 1220 for receiving user inputs. A typical smartphone 1200 also includes a sound encoding/decoding (CODEC) circuit 1206, which digitizes sound received from a microphone into data packets suitable for wireless transmission and decodes received sound data packets to generate analog signals that are provided to the speaker to generate sound. Also, one or more of the processor 1201, transceiver 1208 and CODEC 1206 may include a digital signal processor (DSP) circuit (not shown separately).

The various embodiments may also be implemented on any of a variety of commercially available server devices, such as the server 1300 illustrated in FIG. 13. Such a server 1300 typically includes multiple processor systems one or more of which may be or include a multi-core processor 1301. The processor 1301 may be coupled to volatile memory 1302 and a large capacity nonvolatile memory, such as a disk drive 1303. The server 1300 may also include a floppy disc drive, compact disc (CD) or DVD disc drive 1304 coupled to the processor 1301. The server 1300 may also include network access ports 1306 coupled to the processor 1301 for establishing data connections with a network 1308, such as a local area network coupled to other broadcast system computers and servers.

The processors 1101, 1201, 1301 may be any programmable multi-core multiprocessor, microcomputer or multiple processor chips that can be configured by software instructions (applications) to perform a variety of functions, including the functions and operations of the various embodiments described herein. Multiple processors may be provided, such as one processor dedicated to wireless communication functions and one processor dedicated to running other applications. Typically, software applications may be stored in the internal memory 1102, 1204, 1302 before they are accessed and loaded into the processor 1101, 1201, 1301. In some mobile computing devices, additional memory chips (e.g., a Secure Data (SD) card) may be plugged into the mobile device and coupled to the processor 1101, 1201, 1301. The internal memory 1102, 1204, 1302 may be a volatile or nonvolatile memory, such as flash memory, or a mixture of both. For the purposes of this description, a general reference to memory refers to all memory accessible by the processor 1101, 1201, 1301, including internal memory, removable memory plugged into the mobile device, and memory within the processor 1101, 1201, 1301 itself.

Computer program code or "code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein refer to machine language code (such as object code) whose format is understandable by a processor.

Computing devices may include an operating system kernel that is organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components discussed in this application may be implemented in either the kernel space or the user space, unless expressly stated otherwise.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core, and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present invention is not intended to be limited to the embodiments shown herein but is to be accorded the widest scope consistent with the following claims and the principles and novel features disclosed herein.

What is claimed is:

1. A method of executing tasks in a computing device, comprising implementing a first operator for selective enforcement of intertask execution dependencies, comprising:
   commencing execution of a first task via a first thread of a thread pool in the computing device;
   identifying whether there exists a second task ready for execution such that an operation of the second task identifies the second task as either being dependent on the first task finishing execution or being selectively dependent on the first task finishing execution;
   identifying whether there exists a third task ready for execution such that an operation of the second task identifies the second task as either being dependent on the third task finishing execution or being selectively dependent on the third task finishing execution;
   commencing execution of the second task via a second thread of the thread pool only after determining that the third task has finished execution in response to identifying that there exists a third task ready for execution such that an operation of the second task identifies the second task as being dependent on the third task finishing execution;
   determining whether to enforce the selective dependency of the second task on the third task by determining whether one or more enforcement conditions are satisfied in response to identifying that there exists a third task ready for execution such that an operation of the second task identifies the second task as being selectively dependent on the third task finishing execution;
   ignoring the selective dependency, and commencing execution of the second task via a second thread of the thread pool in response to determining that the one or more enforcement conditions are met; and
   commencing execution of the second task via a second thread of the thread pool only after determining that the third task has finished execution in response to determining that the one or more enforcement conditions are not met, enforcing the selective dependency.

2. The method of claim 1, further comprising implementing a second operation for mandatory enforcement of intertask execution dependencies.

3. A computing device, comprising:
   a processor configured with processor-executable instructions to perform operations comprising implementing a first operation for selective enforcement of intertask execution dependencies comprising:
   commencing execution of a first task via a first thread of a thread pool in the computing device;
   identifying whether there exists a second task ready for execution such that an operation of the second task identifies the second task as either being dependent on the first task finishing execution or being selectively dependent on the first task finishing execution;
   identifying whether there exists a third task ready for execution such that an operation of the second task identifies the second task as either being dependent on the third task finishing execution or being selectively dependent on the third task finishing execution;
   commencing execution of the second task via a second thread of the thread pool only after determining that the third task has finished execution in response to identifying that there exists a third task ready for execution such that an operation of the second task identifies the second task as being dependent on the third task finishing execution;
   determining whether to enforce the selective dependency of the second task on the third task by determining whether one or more enforcement conditions are satisfied in response to identifying that there exists a third task ready for execution such that an operation of the second task identifies the second task as being selectively dependent on the third task finishing execution;
   ignoring the selective dependency, and commencing execution of the second task via a second thread of the thread pool in response to determining that the one or more enforcement conditions are met; and
   commencing execution of the second task via a second thread of the thread pool only after determining that the third task has finished execution in response to determining that the one or more enforcement conditions are not met, enforcing the selective dependency.

4. The computing device of claim 3, wherein the processor is configured with processor-executable instructions to perform operations further comprising implementing a second operation for mandatory enforcement of intertask execution dependencies.

5. The computing device of claim 3, wherein the processor is configured with processor-executable instructions to perform operations such that implementing a first operation for selective enforcement of intertask execution dependencies comprises:
   identifying whether any additional operations of the second task are either dependent or selectively dependent on any additional tasks other than the first task and third tasks finishing execution.

6. The computing device of claim 3, wherein the processor is configured with processor-executable instructions to perform operations such that implementing a first operation for selective enforcement of intertask execution dependencies comprises:
   commencing execution of the second task via a second thread of the thread pool only after determining that additional tasks have finished execution in response to identifying that there exist additional tasks ready for execution such that an operation of the second task identifies the second task as being dependent on the additional tasks finishing execution.

7. The computing device of claim 6, wherein the processor is configured with processor-executable instructions to perform operations such that implementing a first operation for selective enforcement of intertask execution dependencies further comprises:
   in response to identifying that there exist additional tasks ready for execution such that an operation of the second task identifies the second task as being selectively dependent on the additional tasks finishing execution:
      determining whether to enforce the selective dependency of the second task on the additional tasks by determining whether the one or more enforcement conditions are satisfied;

ignoring the selective dependency and commencing execution of the second task via a second thread of the thread pool in response to determining that the one or more enforcement conditions are not met; and enforcing the dependency and commencing execution of the second task via a second thread of the thread pool only after determining that the additional tasks have finished execution in response to determining that the one or more enforcement conditions are met.

8. The computing device of claim 3, wherein the processor is configured with processor-executable instructions to perform operations such that:

commencing execution of the first task via the first thread of the thread pool comprises executing the first task in a first processing core of the computing device; and commencing execution of the second task via the second thread of the thread pool comprises executing the second task in a second processing core of the computing device prior to or concurrent with execution of the first task in the first processing core.

9. The computing device of claim 3, wherein the processor is configured with processor-executable instructions to perform operations such that the one or more enforcement conditions are evaluated at the time of execution.

10. The computing device of claim 3, wherein the processor is further configured with processor-executable instructions to perform operations comprising:

receiving execution preference information prior to commencing execution of the first task; and setting the one or more enforcement conditions in response to receiving the execution preference information and based upon the execution preference information.

11. A non-transitory processor-readable storage medium having stored thereon processor-executable instructions to cause a processor to perform operations comprising implementing a first operation for selective enforcement of intertask execution dependencies comprising:

commencing execution of a first task via a first thread of a thread pool in the computing device;

identifying whether there exists a second task ready for execution such that an operation of the second task identifies the second task as either being dependent on the first task finishing execution or being selectively dependent on the first task finishing execution;

identifying whether there exists a third task ready for execution such that an operation of the second task identifies the second task as either being dependent on the third task finishing execution or being selectively dependent on the third task finishing execution;

commencing execution of the second task via a second thread of the thread pool only after determining that the third task has finished execution in response to identifying that there exists a third task ready for execution such that an operation of the second task identifies the second task as being dependent on the third task finishing execution;

determining whether to enforce the selective dependency of the second task on the third task by determining whether one or more enforcement conditions are satisfied in response to identifying that there exists a third task ready for execution such that an operation of the second task identifies the second task as being selectively dependent on the third task finishing execution;

ignoring the selective dependency, and commencing execution of the second task via a second thread of the thread pool in response to determining that the one or more enforcement conditions are met; and commencing execution of the second task via a second thread of the thread pool only after determining that the third task has finished execution in response to determining that the one or more enforcement conditions are not met, enforcing the selective dependency.

12. The non-transitory processor-readable storage medium of claim 11, wherein the processor-executable instructions are configured to cause a processor to perform operations further comprising implementing a second operation for mandatory enforcement of intertask execution dependencies.

13. The non-transitory processor-readable storage medium of claim 11, wherein the processor-executable instructions are configured to cause a processor of a computing device to perform operations such that that implementing a first operation for selective enforcement of intertask execution dependencies comprises:

identifying whether any additional operations of the second task are either dependent or selectively dependent on any additional tasks other than the first task and third tasks finishing execution.

14. The non-transitory processor-readable storage medium of claim 13, wherein the processor-executable instructions are configured to cause a processor of a computing device to perform operations such that that implementing a first operation for selective enforcement of intertask execution dependencies comprises:

commencing execution of the second task via a second thread of the thread pool only after determining that the additional tasks have finished execution in response to identifying that there exist additional tasks ready for execution such that an operation of the second task identifies the second task as being dependent on the additional tasks finishing execution.

15. The non-transitory processor-readable storage medium of claim 13, wherein the processor-executable instructions are configured to cause a processor of a computing device to perform operations such that that implementing a first operation for selective enforcement of intertask execution dependencies comprises further comprises:

in response to identifying that there exist additional tasks ready for execution such that an operation of the second task identifies the second task as being selectively dependent on the additional tasks finishing execution:

determining whether to enforce the selective dependency of the second task on the additional tasks by determining whether the one or more enforcement conditions are satisfied;

ignoring the selective dependency and commencing execution of the second task via a second thread of the thread pool in response to determining that the one or more enforcement conditions are not met; and enforcing the dependency and commencing execution of the second task via a second thread of the thread pool only after determining that the additional tasks have finished execution in response to determining that the one or more enforcement conditions are met.

16. The non-transitory processor-readable storage medium of claim 11, wherein the processor-executable instructions are configured to cause a processor of a computing device to perform operations such that:

commencing execution of the first task via the first thread of the thread pool comprises executing the first task in a first processing core of the computing device; and commencing execution of the second task via the second thread of the thread pool comprises executing the second task in a second processing core of the computing device prior to or concurrent with execution of the first task in the first processing core.

17. The non-transitory processor-readable storage medium of claim 11, wherein the processor-executable instructions are configured to cause a processor of a computing device to perform operations further comprising:
   receiving execution preference information prior to commencing execution of the first task; and
   setting the one or more enforcement conditions in response to the receiving and based upon the execution preference information.

* * * * *